Figure 1:
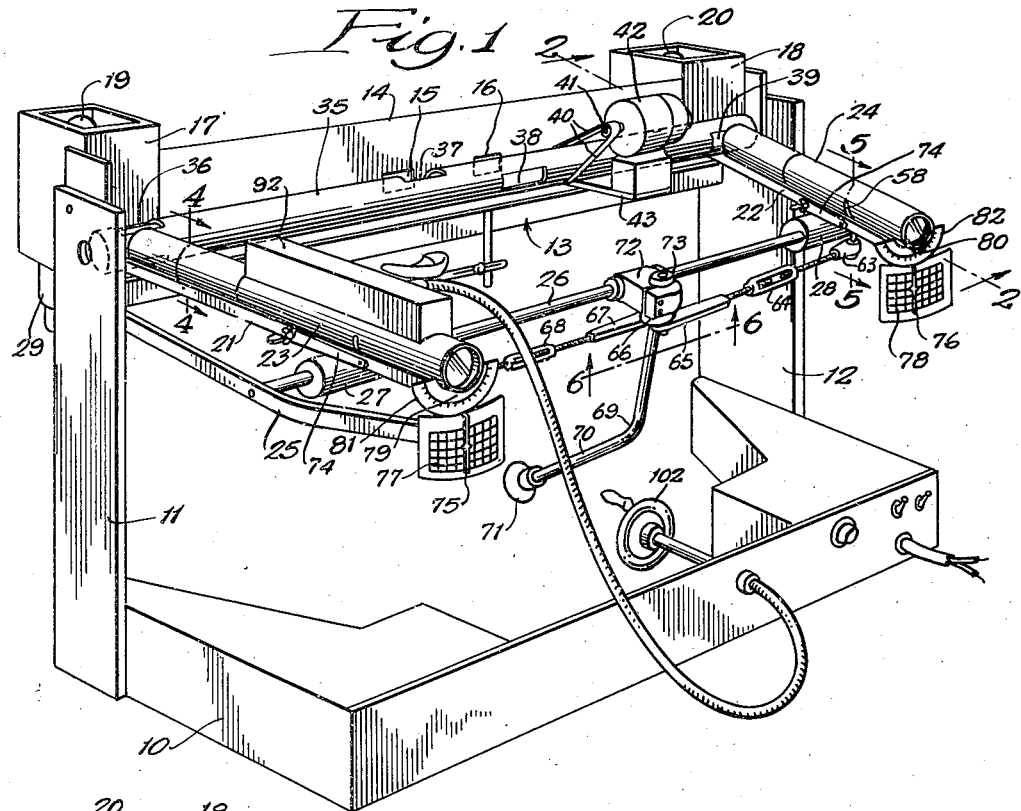

Nov. 20, 1945.  J. R. KERRY  2,389,155
OPTICAL DEVICE
Filed July 23, 1942  4 Sheets-Sheet 1

Inventor:
John R. Kerry,
By Dawson, Orms and Booth
Attorneys.

Nov. 20, 1945. J. R. KERRY 2,389,155
OPTICAL DEVICE
Filed July 23, 1942 4 Sheets-Sheet 2
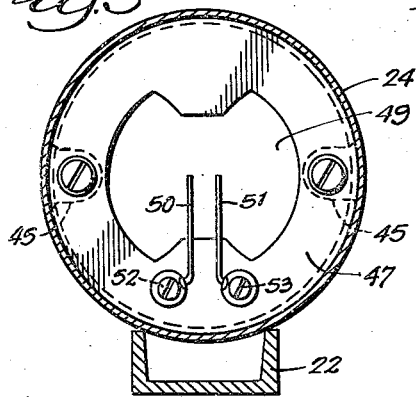
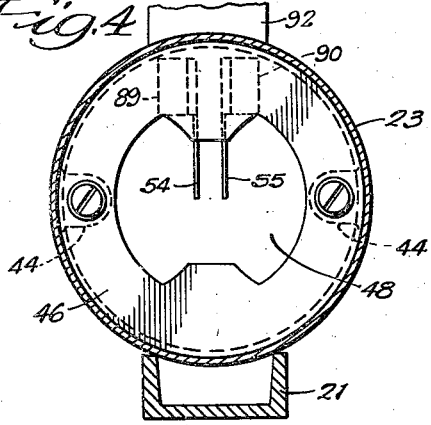
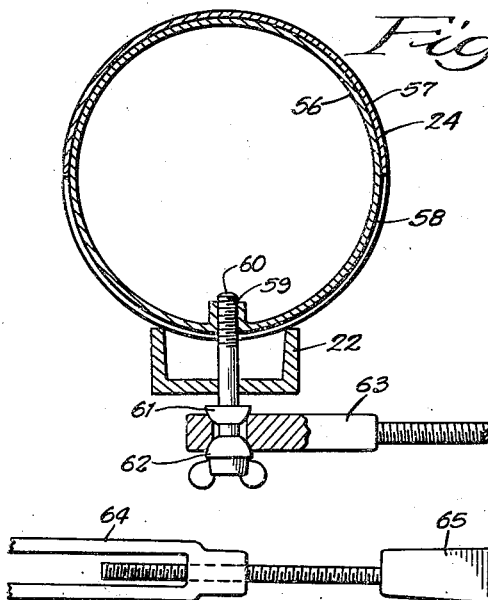
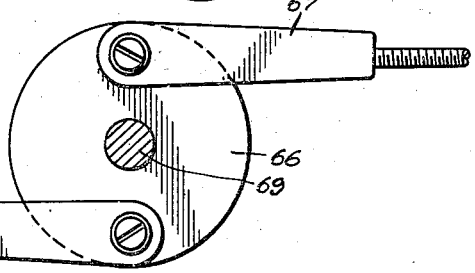
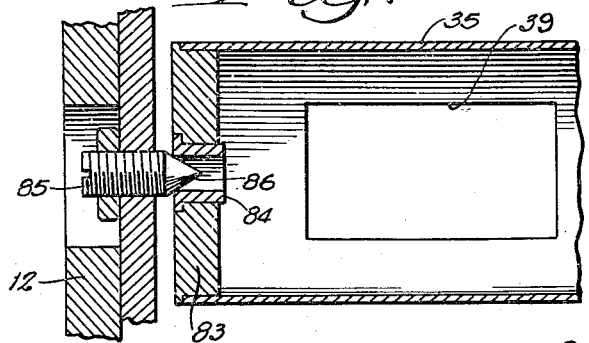
Inventor
John R. Kerry,
By Dawson, Ooms & Booth
Attorneys.

Nov. 20, 1945.  J. R. KERRY  2,389,155
OPTICAL DEVICE
Filed July 23, 1942  4 Sheets-Sheet 3
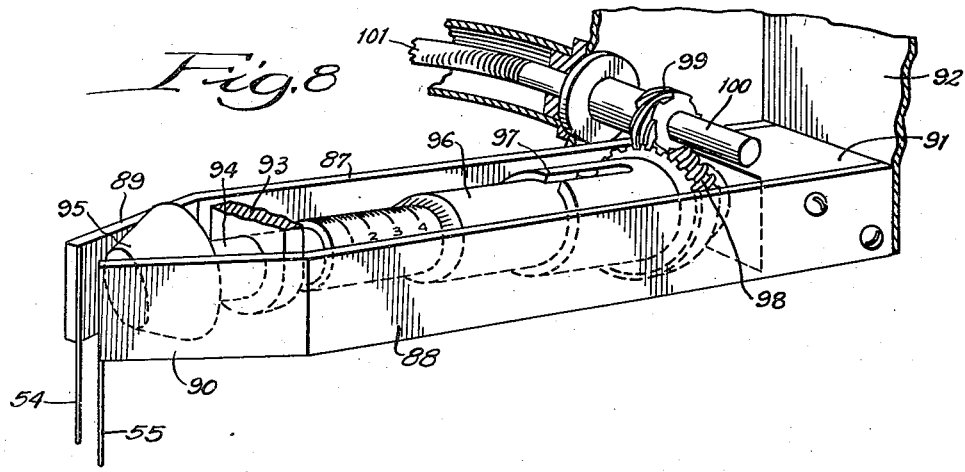
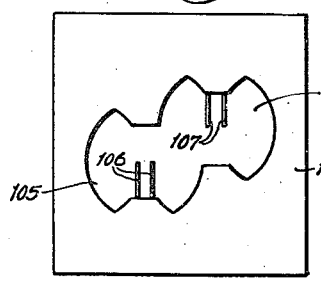
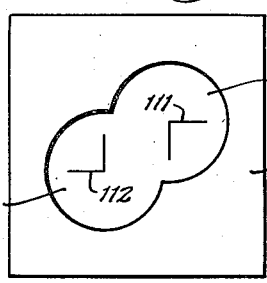
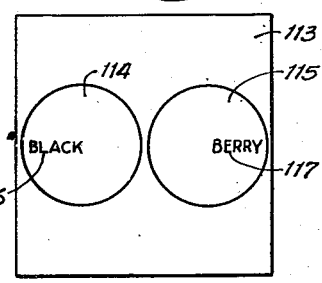
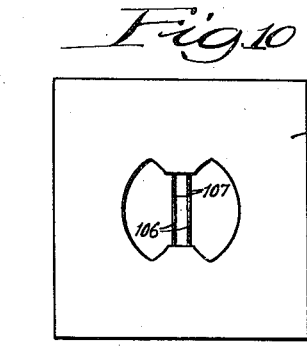
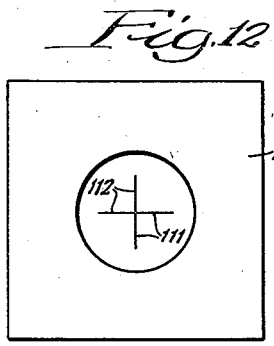
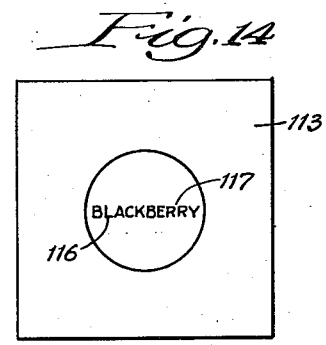
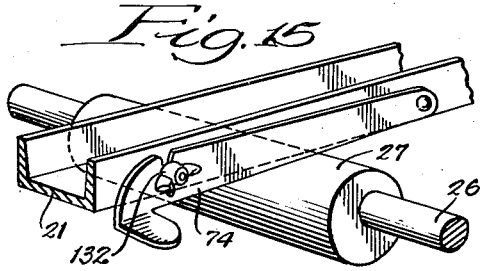
Inventor:
John R. Kerry,
By Dawson, Ooms & Borth,
Attorneys.

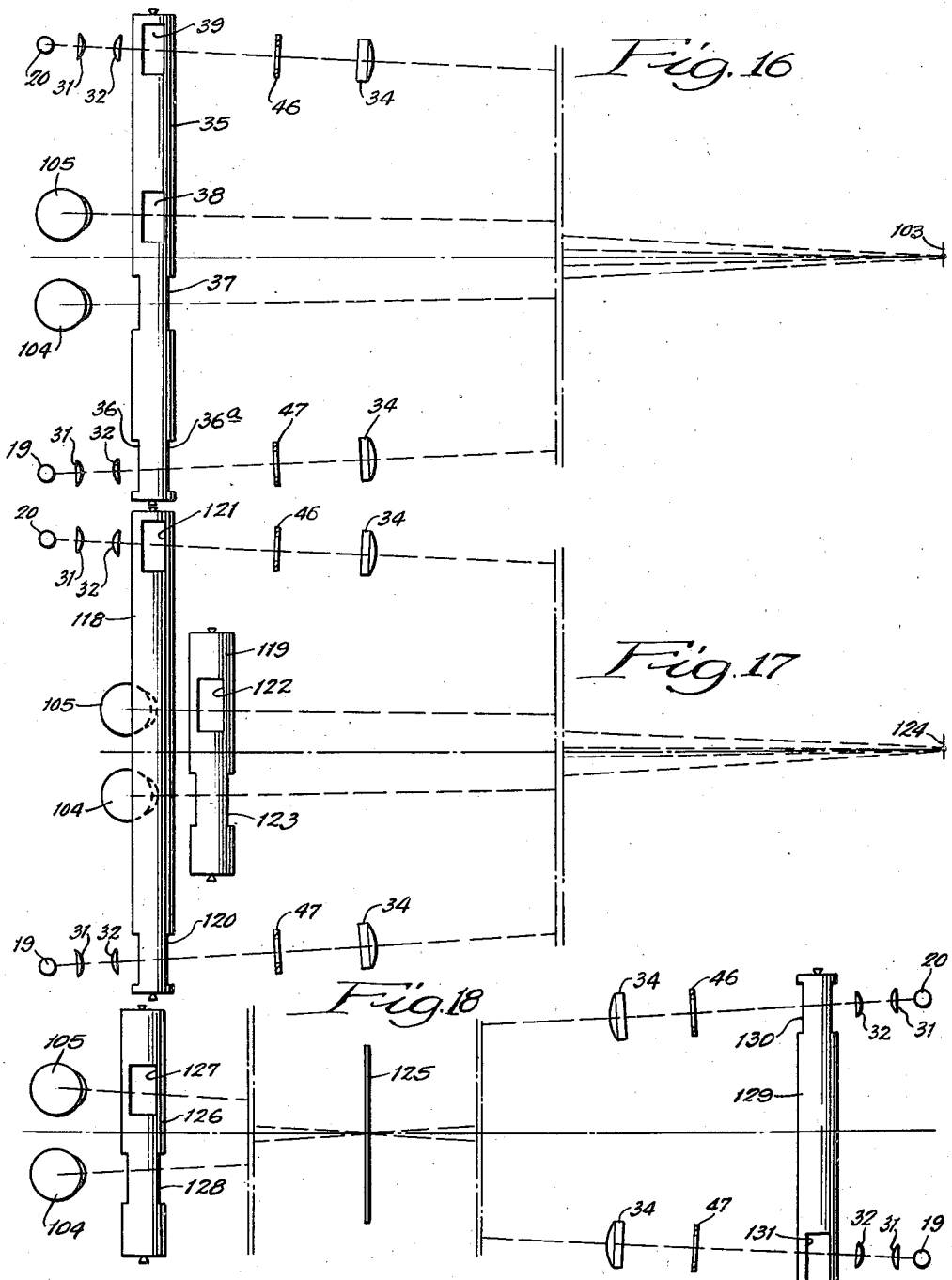

Patented Nov. 20, 1945

2,389,155

UNITED STATES PATENT OFFICE 2,389,155

OPTICAL DEVICE

John R. Kerry, Palatine, Ill., assignor, by mesne assignments, to American Optical Company, Southbridge, Mass., a voluntary association of Massachusetts Application July 23, 1942, Serial No. 451,997

8 Claims. (Cl. 88—20)

This invention relates to an optical device, and more particularly to a device for accomplishing the complete separation of the visual fields of a pair of eyes and adapted for use in the examination measurement and training of eyes in their several functional performances.

An object of the invention is to provide a device for measuring the comparative magnification of images between two eyes of a patient. Another object is to provide apparatus for determining and measuring phorias or muscular imbalance of each of the eyes of a patient. Still another object is to provide apparatus for independently testing and measuring vision of each of a pair of eyes.

Another object of the invention is to provide in an optical device separate fields of vision for each of a pair of eyes and to separately measure the vision of the eyes. Yet another object is to provide a pair of visual targets in adjacent relation on a target surface and mechanism for maintaining each target in the field of vision of only one of a pair of eyes.

A further object is to provide a pair of visual targets in adjacent relation on the same target surface and means for providing a path of vision between one of a pair of eyes and one target and between the other eye and the other target together with means for interrupting each path of vision at periodic intervals, the intervals being so short as to provide substantial continuity of vision for each eye with respect to the target which it observes.

Another object of the invention is to provide a pair of visual targets in adjacent relation on a target surface and mechanism for adjusting the position of one of the targets with respect to the other to bring the targets into a predetermined relation with respect to the vision of the observer. Yet another object is to provide a mechanism for adjusting the position of the targets on the surface with respect to each other and for measuring the adjustment. Still another object is to provide an adjusting mechanism for simply and easily changing the position of one of a pair of targets on a target surface with respect to the other and for changing the shape of one of the targets to bring the same into cooperative relation with the other target according to the vision of the observer.

Other features and advantages will appear from the following specification and drawings, in which—

Figure 2:
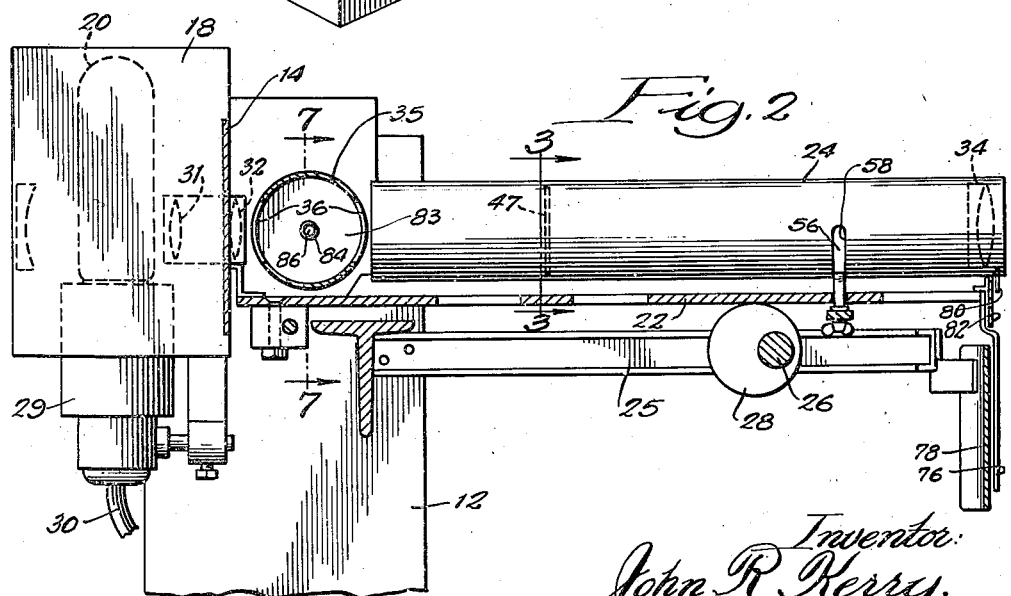

Figure 1 is a perspective view of a device embodying the invention; Fig. 2 is a fragmentary longitudinal sectional view taken along the line 2—2 of Fig. 1; Fig. 3 is a transverse sectional view taken along the line 3—3 of Fig. 2; Fig. 4 is a transverse sectional view taken along the line 4—4 of Fig. 1; Fig. 5 is a transverse sectional view taken along the line 5—5 of Fig. 1; Fig. 6 is a fragmentary horizontal sectional view taken along the line 6—6 of Fig. 1 and showing, in elevation, the crank arm actuating means for operating the mechanism for adjusting the position of the targets; Fig. 7 is a detail fragmentary sectional view taken along the line 7—7 of Fig. 2; Fig. 8 is a fragmentary perspective view of the mechanism for adjusting the lines of the target; Fig. 9 is a front elevational view of a target surface showing a pair of visual targets thereon; Fig. 10 is a similar view with the targets adjusted in position to bring them into cooperative relation; Fig. 11 is a front elevational view of a target surface showing another pair of targets; Fig. 12 is a similar view of the same surface with the targets in adjusted position; Fig. 13 is a front elevational view of a target surface showing another pair of targets; Fig. 14 is a similar view of the same surface showing the targets in adjusted position; Fig. 15 is a fragmentary detail perspective view of an adjusting cam and the frame member carried thereby; Fig. 16 is a diagrammatic view showing the optical arrangement of the embodiment of the invention shown in Figs. 1 to 15; Fig. 17 is a diagrammatic view of another embodiment of the invention; and Fig. 18 is a diagrammatic view of another embodiment of the invention.

It has heretofore been found that the eyes of a person may possess different power to magnify objects which are observed and retinal images of different sizes may be produced by the two eyes. This effect may be present whether or not the person wears glasses. A difference in the magnifying power of the two eyes has been found to cause fatigue to the patient as a result of the difficulty of synchronizing the retinal images of different sizes.

The present invention contemplates a device by means of which the difference in magnifying power of the two eyes of the patient may be determined and measured so that lenses may be provided to compensate for this difference. The device is also suitable for determining and measuring phorias or muscular imbalances of the eyes of a patient and for testing in other respects the vision of the patient.

In the embodiment of the invention described herein and referring particularly to Fig. 1, the device includes a base 10 supporting a pair of vertical frame members 11 and 12 which, in turn, support between them a horizontal platform 13.

The platform 13 carries a horizontal member 14 which acts as a shield for the eyes of the patient and is equipped with a pair of apertures 15 and 16 which may be placed before the eyes of the patient. At the opposite ends of the member 14 are the housings 17 and 18 which may be supported in position in any suitable manner and which are arranged to receive lamps 19 and 20 for projecting a visual target.

Horizontal supports 21 and 22 are pivotally supported by the frame member 13 and extend outwardly therefrom. On the supports 21 and 22 are mounted the tubular casings 23 and 24 which provide an optical system for the projection of an image. The frame member 25 supports one end of a shaft 26 on which are mounted cams 27 and 28 beneath the supports 21 and 22 respectively. The opposite end of the shaft 26 is supported by another frame member (not shown) carried by the member 12.

As seen particularly in Fig. 2, the projection system includes the housing 18 and the lamp 20 mounted therein. The lamp 20 may be carried by any suitable socket 29 having a connection 30 leading to a suitable source of electric current. A pair of lenses 31 and 32 serve to concentrate and focus the beam of light on one side of the lamp. The beam of light from the lamp passes through the lenses 31 and 32 and into the casing 24 which is equipped with a plate 47 for forming a visual target. A lens 34 at the end of the tubular casing 24 focuses the beam of light which is projected therefrom.

A tubular shutter 35 is interposed between the housings 17 and 18 and behind the casings 23 and 24 respectively. The shutter may be of any suitable construction and is preferably a tubular member equipped with apertures 36, 37, 38 and 39, the apertures 36 and 37 being in longitudinal alignment with each other and the apertures 38 and 39 being in longitudinal alignment with each other and being disposed at an angle of 90° with respect to the apertures 36 and 37 on the periphery of the tubular shutter 35. The shutter 35 is provided in each case with an aperture directly opposite the enumerated apertures so as to permit a beam of light to pass through the shutter. Thus, the shutter is equipped with the aperture 36ª opposite the aperture 36 which permits the beam of light to pass from the housing 18 into the casing 24. The shutter 35 is rotatably supported by the frame members 11 and 12 and is arranged to be driven by a belt 40 carried by the pulley 41 on the motor 42. Preferably, the motor is equipped with a rubber mounting to decrease the vibration caused by the operation of the same and may be supported by an extension 43 of the platform 13.

As seen particularly in Figs. 3 and 4, the casings 23 and 24 are equipped intermediate their ends with lugs 44 and 45 for supporting the plates 46 and 47 respectively. The central portions of the plates 46 and 47 are apertured as at 48 and 49 in order to permit the beams of light in the casings to pass through the plates. Wires 50 and 51 mounted at 52 and 53 on the plate 47 extend partially across the aperture 49 while similar wires 54 and 55 extend partially across the aperture 48. These wires provide spaced lines on the visual targets which are formed on the target surface by the two projectors. The apertures 48 and 49 may be of any suitable size and shape, the apertures illustrated in Figs. 3 and 4 being particularly suitable for the determination and measurement of difference in the powers of magnification of the two eyes of the patient.

The casing 24 may consist of a pair of tubular members 56 and 57 received telescopically within each other in fixed relation. If desired, the members may be arranged for longitudinal telescopic adjustment to permit adjustment of the focus of the beam of light passing through the casing 24. The member 57 may be equipped with a transverse slot 58 intermediate its ends. In alignment with this slot 58 the tubular member 56 is equipped with an internally threaded opening 59 for threadedly receiving the bolt 60. The bolt 60 extends downwardly from the tubular casing 24 and is equipped with shoulder 61 for engaging the support 21 and is provided with a thumbscrew head 62 for tightening the casing 24 against the support 22. The bolt 60 passes through an aperture in the end of the rod 63 and is received thereby.

As seen particularly in Figs. 1 and 6, a turnbuckle 64 of the conventional type connects the rod 63 to an arm 65 mounted on the crank 66. A similar crank arm 67 is attached to the opposite side of the disc 66 and connects through a turnbuckle 68 with a similar mechanism for engaging the casing 23. A shaft 69 secured to the center of the crank disc 66 and extending downwardly therefrom is equipped with an inwardly turned lower portion 70 and a handle 71 for turning the shaft.

Rotation of the shaft 69 produces rotation of the disc 66 and movement of the crank arms 65 and 67 to laterally shift the casings 23 and 24 toward or away from each other. The turnbuckles 64 and 68 may be used to adjust the length of the crank arms which are connected to the casings 23 and 24.

Referring particularly to Figs. 1 and 15, the cams 27 and 28 may be used to shift the vertical position of the casings 23 and 24. On the central portion of the shaft 26 is mounted a member 72 which receives the shaft 69. A collar 73 is secured to the upper portion of the shaft 69 to fix the same in position with respect to the member 72. Movement of shaft 69 in a vertical plane thus produces rotation of the member 72 and rotation of the shaft 26. The cams 27 and 28 are rotated by movement of the shaft 26 and produce a raising or lowering of the casings 23 and 24. The cams 27 and 28 are preferably arranged so that the enlarged portions thereof are disposed at angles of 180° with respect to each other. In this manner, when the shaft is rotated to raise the casing 23, the casing 24 is lowered, while movement of the shaft to raise the casing 24 produces a lowering of the casing 23.

As seen particularly in Fig. 15, the support 21 above the cam 27 may be equipped with an adjustable bracket 74 which engages the cam 27. A thumb screw 132 permits vertical adjustment of the bracket 74 with respect to the channelled support member 21. In this manner, the vertical position of either the casing 23 or the casing 24 may be adjusted independently without movement of the other casing.

The frame members 25 are equipped at their ends with charts 77 and 78 for measuring the vertical and horizontal displacement of the casings 23 and 24. The charts 77 and 78 are suitably marked to permit calibration of the same. The supports 21 and 22 for the casings 23 and 24 are equipped with depending pointers 75 and 76 which are disposed in adjacent relation to the charts 77 and 78. The pointers are constructed to provide an indicator for the vertical as well as the horizontal displacement of the casing. The ends of the casings may also be provided with pointers 79 and 80 which cooperate with the scales 81 and 82 to indicate the rotational displacement of each of the casings 23 and 24.

The shutter 35 may be supported by the frame in any suitable manner. As seen in Fig. 7, the end of the shutter is preferably provided with a closure member 83 carrying an annular journal 84. An adjustable screw 85 equipped with a conical bearing surface 86 at its end may be received within the journal 84 to rotatably support the end of the shutter.

Referring particularly to Figs. 4 and 8, the wires 54 and 55 may be supported by a pair of spaced members 87 and 88 which are turned inwardly toward each other at their end portions 89 and 90. The members 87 and 88 are fixedly mounted in a support 91 within the housing 92. A depending lug 93 carried by the housing 92 fixedly receives the micrometer body (on which the suitable scale 1, 2, 3, etc., is engraved) and supports it in a predetermined position. The micrometer screw plunger 94 undergoes longitudinal displacement whenever the micrometer headpiece 96 is rotated. A cam 95, having the shape of a frustum of a cone, is accurately fitted to the end of shaft 94 and so moves both rotationally and longitudinally with it. Spring tension within members 87 and 88 causes their inclined end portions 89 and 90 to rest in contact with opposite faces of cam 95 at all times. For this reason, any longitudinal change in the position of cam 95 causes a proportional change in the spacing of the members 87 and 88. The head of the micrometer 96 undergoes the same rotational and longitudinal displacement that shaft 94 undergoes and so is fitted with a driving pin, which in turn is engaged slidably by a channel within the sleeve 97. Sleeve 97 is supported by and rotates upon an axle or spindle that projects rigidly (fixedly) from supporting member 91. Sleeve 97 is so fixed that it is capable of rotational motion only. The worm gear 98 is rigidly fixed to sleeve 97. The worm gear 98 meshes with the worm 99 on the shaft 100 which, in turn, is connected to the flexible shafting 101. The flexible shafting 101 leads to a crank 102 (Fig. 1) by means of which the shaft 100 may be rotated to shift the longitudinal position of the shaft 94.

The micrometer 96 may be of conventional construction and need not be described in detail herein. It is sufficient that the micrometer be adapted to measure precisely small longitudinal changes in the position of the shaft 94 and the cam 95 carried thereby. When the crank 102 is operated, the worm 99 and gear 98 are rotated. The shaft 94 and cam 95 carried thereby are longitudinally shifted and the movement of the cam produces movement of the wires 54 and 55 toward and away from each other. With this mechanism extremely small changes in the distance between the wires 54 and 55 may be accurately obtained and measured.

The visual targets which are projected by the instrument may be of any suitable type. When the target-forming plates shown in Figs. 3 and 4 are used, the target which is projected will be of the type shown in Figs. 9 and 10. This target may be projected upon a screen of the conventional type.

As seen in Fig. 9, the screen 103 may receive the visual targets 104 and 105 having therein the spaced parallel lines 106 and 107 which are formed by the spaced parallel wires in the target-forming plates. When projected on the screen 103, the targets may have the appearance indicated in Fig. 9. The observer or patient, when using the instrument, adjusts the controls of the instrument until the targets are brought into the position in which they appear in juxtaposed relation as seen in Fig. 10, with the lines 106 in alignment with the lines 107.

The visual targets 104 and 105 are of similar contour patterns as shown in Fig. 9, which contour patterns, because of their similarity, possess fusible characteristics. It is due to these fusible characteristics that the said contour patterns will appear in juxtaposed relation with each other, as seen in Fig. 10, and will be retained in said relation only through said fusible characteristics. This is commonly known in the art.

For measuring muscular imbalances, the type of target shown in Figs. 11 and 12 has been found to be particularly suitable. As seen in Fig. 11, the screen 108 receives the targets 109 and 110, the targets being provided with angular lines 111 and 112. With this type of target, the patient and observer adjusts the position of the targets until the lines 111 and 112 are in the relation seen in Fig. 12.

Another type of target which may be used is that seen in Figs. 13 and 14 where the screen 113 receives a pair of targets 114 and 115 bearing legends 116 and 117, of any desired type. The patient or observer may bring the targets into such relation as to provide a continuity between the legends 116 and 117 appearing on the two separate targets.

It is to be noted that the targets 114 and 115 are of similar contour shape and are, therefore, fusible. It is through their fusible characteristics that the observer may bring the targets into such relation as to provide continuity between the legends 116 and 117. If the contour patterns of the targets 114 and 115, as commonly known in the art, did not possess fusible characteristics and the individual under test had an error of phoria, it would be impossible to provide a continuity between the legends 116 and 117 as called for. It is to be particularly noted that the contours of the targets 109 and 110 possess similar fusible contours thereby enabling the angular lines 111 and 112 to assume the relation shown in Fig. 12. The drawings, therefore, clearly illustrate the fusible characteristics of the contours of the various targets by means of Figs. 10, 12 and 14.

As seen particularly in Fig. 16, the device is equipped with a target surface 103 upon which visual targets may be projected. The lamp 19 provides a beam of light which passes through the lenses 31 and 32, through the apertures 36 and 36a in the shutter 35 and through the target-forming plates 46 and 47 and lens 34 to form a target on the target surface 103. Similarly, the lamp 20 provides a beam of light which passes through the projection system of the casing 24. The eyes 104 and 105 of the patient or observer perceive the target through the apertures 37 and 38 in the shutter 35, the arrangement of the apertures in the shutter being such that the eye 104 perceives the target formed by the plate 47 and the eye 105 perceives the target formed by the plate 46. At the time that the target formed by the plate 46 is visible on the target surface 103, the shutter 35 serves to intercept the vision of the eye 104 while permitting the eye 105 to perceive the target through the aperture 38. Similarly, when the target formed by the plate 47 is visible on the target surface 103, the shutter 35 intercepts the vision of the eye 105 while permitting the eye 104 to perceive the target through the aperture 37 in the shutter.

Other suitable arrangements of the target surface and shutter mechanism may be readily worked out. As seen particularly in Fig. 17, the shutter may comprise a pair of tubes 118 and 119. These tubes are provided with apertures 120, 121, 122 and 123. The visual targets are projected on the target surface 124. The lamps 19 and 20 are disposed adjacent the apertures 120 and 121 respectively in the tubular shutter 118. The eyes 104 and 105 of the patient or observer are arranged adjacent the apertures 123 and 122 respectively in the tubular shutter 119. The tubular shutters 118 and 119 are rotated in synchronism so that the aperture 122 opens the field of vision of the eye 105 when the target formed by the light from the lamp 20 is visible on the screen or the target surface 124. At the same time, the apertures 120 and 123 are closed. The apertures 120 and 123 in turn are opened while the apertures 121 and 122 are closed.

As seen particularly in Fig. 18, the target surface may, if desired, consist of a translucent screen 125 disposed between the projection system and the eyes of the observer. With this construction, a tubular shutter 126 equipped with apertures 127 and 128 is arranged adjacent the eyes 104 and 105 of the observer. On the other side of the translucent screen 125 are the lamps 19 and 20 and the projection systems forming targets from the beams projected by the lamps. A tubular shutter 129 equipped with apertures 130 and 131 may be arranged adjacent the lamps 19 and 20. The aperture 130 permits the passage of the beam of light from the lamp 20 while the aperture 131 permits the passage of the beam of light from the lamp 19. The tubular shutters 126 and 129 are rotated in synchronism so that when the aperture 130 is open and a target is formed on the screen 125 from the beam of light from the lamp 20, the aperture 128 will be open and the eye 104 will perceive this target. At this time, the apertures 127 and 131 are closed. Similarly, when the aperture 131 is opened, permitting the formation on the screen 125 of a visual target from the beam of light from the lamp 19, the aperture 127 is open and the eye 105 perceives this target. At this time, the apertures 128 and 130 will be closed.

Operation

In operation the observer or patient is placed before the instrument with the apertures 15 and 16 in the frame 14 being before the eyes 104 and 105 of the patient. The lamps 19 and 20 of the projection system are lighted and the shutter 35 set in rotation by operation of the motor 42. The shutter is rotated at a speed which provides for the interception of the beams of light of the projection systems and for the interception of the visual field of the eyes of the observer at a rate which permits continuity of the vision of the observer. By this is meant that the fields of vision of the observer and the projection of the visual targets are interrupted at periodic spaced intervals, the intervals being sufficiently short to provide continuity of the retinal image which is received by the observer. The instrument serves to completely dissociate the fields of vision of the two eyes of the patient and to synchronize the interruption of these fields of vision with the interruption of the projection of the visual targets. When one target is visible only one eye may perceive it. When the other target becomes visible only the other eye may perceive it.

The visual targets which are formed on the screen or target surface may be of the character seen in Figs. 9 and 10 wherein a pair of spaced parallel lines appear in the central aperture of each of the targets. The patient, by adjusting the control lever 71 to move the casings 23 and 24 in the vertical and horizontal planes, may bring the two visual targets into adjacent relation with the lines 106 and 107 of the targets in approximate alignment with each other. This adjustment of the horizontal and vertical positions of the projection casings 23 and 24 permits the compensation for the muscular imbalances of the eyes of the patient.

When the lines 106 and 107 of the targets 104 and 105 are in approximate alignment, the patient may then adjust the distance between the pair of lines 107 by operating the hand crank 102. The operation of the crank causes the cam to be shifted longitudinally. This, in turn, causes equal and opposite shifts in the lateral positions of the members 87 and 88 since their spring tensions cause their respective inclined end portions 89 and 90 to follow the cam at all times. This causes a change in the spacing between wires 54 and 55, Fig. 4, because these wires are rigidly fixed to the extreme ends of members 87 and 88 respectively, and are free to move with these members. The distance between the lines 107 in the target changes simultaneously and proportionately because these lines are the projected images of wires 54 and 55. In addition, the spacings between the lines 107 are proportional to the readings of the micrometer, and the values of these spacings may be plotted graphically as functions of the micrometer scale readings. The adjustment of the crank may be continued until the lines 106 appear to the patient to be spaced apart by exactly the same distance by which the lines 107 are separated. The corresponding micrometer reading is then recorded.

The magnitude of the difference in the magnifications that may exist for the two eyes of a patient is measured by the ratio of the distance between lines 107 to the distance between lines 106. By computing these ratios for several representative values of the distance between lines 107 and plotting them against the corresponding micrometer readings, a calibration chart for the instrument is easily established. The magnitude of the difference in the magnifications of the eyes of a patient is then found by reading from the calibration chart the magnification value corresponding to the micrometer reading recorded for that patient.

With this instrument, any difficulty in compensating for phorias or muscular imbalances of eyes is completely obviated. These muscular imbalances may vary during the course of the tests which are made on the eyes. However, with this instrument, the phorias are automatically compensated by the horizontal and vertical adjustment of the casings 23 and 24 immediately before the adjustment for magnification is made.

If it is desired to measure the muscular imbalances of the eyes directly, it may be desirable to use the type of target shown in Figs. 11 and 12 wherein a pair of angular lines are disposed within the central apertures of the target. With this type of target, the patient is free to move element 111 in any direction with respect to element 112. He does so until the vertices of the two angular elements appear to him to meet at the center of a symmetrical cross, as in Fig. 12. If there is no muscular imbalance, the targets on the screen will be exactly as shown in Fig. 12. If there is a muscular imbalance, they will be displaced relative to each other in proportion to its direction and extent. Fig. 11 shows a typical arrangement in which there is a combination of both a vertical and a lateral muscular imbalance. The magnitude of these imbalances is expressed in terms of the angular displacements, measured at the patient's eye, in both the vertical and horizontal meridians.

The device may also be used for any of the usual type of visual acuity tests, and is particularly advantageous in that it provides a means of testing the vision of one of the eyes of the patient without actually shutting off the vision of the other eye and perhaps interfering with the tests on the first eye.

The targets of the type shown in Figs. 13 and 14 may be used for the usual vision tests and are particularly suitable in determination of malingering. These targets may be formed by inserting slides in the projection casings 23 and 24, or in any other suitable manner. The patient may be directed to place the legends which appear on the different targets in proper relation. If this is done, there is no question as to the vision of the patient in each of the eyes. Different types of targets may be used for each of the eyes and the legends may be of different sizes, if desired.

Although the invention has been described in connection with specific embodiments and specific methods of operation, it is apparent that many changes and modifications may be made in the construction and operation of the instrument without departing from the spirit and scope of the invention.

I claim:

1. A device of the character described for use with a viewing screen, said device comprising means for producing test patterns for the respective eyes of an individual on said viewing screen, said test pattern means embodying means for producing area portions having fusible characteristics and embodying means for producing portions having dimensionally relatable characteristics within the fields of said area portions with the dimension of one of said relatable portions being variable relative to the dimension of the other of said portions, means for alternately rendering the test patterns separately visible to the respective eyes in successive sequence and at such speed as to provide continuity of vision, unitary means for altering the positional relation of said area portions and portions having dimensionally relatable characteristics both vertically and horizontally with respect to each other for positioning said area portions in fusible overlapping relation with each other and for simultaneously positioning the portions having dimensionally relatable characteristics in adjacent relation with each other and means for altering the dimension of one of said dimensionally relatable portions relative to the other.

2. A device of the character described for use with a viewing screen, said device comprising means for producing test patterns for the respective eyes of an individual on said viewing screen, said test pattern means embodying means for producing area portions having fusible characteristics and embodying means for producing portions having dimensionally relatable characteristics within the fields of said area portions with the dimension of one of said relatable portions being variable relative to the dimension of the other of said portions, means for alternately rendering the test patterns separately visible to the respective eyes in successive sequence and at such speed as to provide continuity of vision, unitary means for altering the positional relation of said area portions and portions having dimensionally relatable characteristics both vertically and horizontally with respect to each other for positioning said area portions in fusible overlapping relation with each other and for simultaneously positioning the portions having dimensionally relatable characteristics in adjacent relation with each other, means for altering the dimension of one of said dimensionally relatable portions relative to the other and means for altering the meridional relation of one of said area portions relative to the other.

3. A device of the character described for use with a viewing screen, said device comprising means for producing and for successively projecting test patterns for the respective eyes of an individual alternately on said viewing screen at periodic intervals, means for alternately rendering the test patterns separately visible to said respective eyes at such speed as to provide continuity of vision, said test pattern means embodying portions adjustable to appear in juxtaposed relation with each other on said viewing screen and embodying portions relatable as to dimensional characteristics, with the dimension of one of said relatable portions being variable relative to the dimension of the other relatable portion while retaining said juxtaposed portions in said relation.

4. A device of the character described for use with a viewing screen, said device comprising means for producing and for projecting a test pattern for each of the respective eyes of an individual to be viewed on said viewing screen, means for providing separate paths of vision for each of the respective eyes for viewing said test patterns and unitary means having portions functioning cooperatively with the means for producing and projecting the test patterns and with the separate paths of vision for alternately and successively rendering the test patterns separately visible to said respective eyes with the speed of alternating being such as to provide continuity of vision, said test pattern means embodying portions adjustable to appear in juxtaposed relation with each other and embodying portions relatable as to dimensional characteristics, with the dimension of one of said relatable portions being variable relative to the dimension of the other relatable portion while retaining said juxtaposed portions in said relation.

5. A device of the character described for use in combination with a viewing screen, said device comprising a pair of projectors embodying means for producing and projecting test patterns for the respective eyes of an individual to be viewed on said viewing screen, means having a pair of sight openings therein for locating the head of an individual to be tested at a given position relative to said device and means having portions associated with said respective sight openings and projectors for alternately and successively rendering the test patterns separately visible to said respective eyes with the speed of alternating being so controlled as to provide continuity of vision, said test pattern means embodying portions adapted to be positioned in juxtaposed relation with each other and embodying portions relatable as to dimensional characteristics, with the dimension of one of said relatable portions being variable relative to the dimension of the other relatable portion while retaining said juxtaposed portions in said relation.

6. A device of the character described for use in combination with a viewing screen, said device comprising a pair of projectors embodying means for producing and projecting test patterns for the respective eyes of an individual to be viewed on said viewing screen, means having a pair of sight openings therein for locating the head of an individual to be tested at a given position relative to said device and means having portions associated with said respective sight openings and projectors for alternately and successively rendering the test patterns separately visible to said respective eyes with the speed of alternating being so controlled as to provide continuity of vision, said test pattern means embodying portions adapted to be positioned in juxtaposed relation with each other and embodying portions relatable as to dimensional characteristics with the dimension of one of said relatable portions being variable relative to the dimension of the other relatable portion, means for moving said portions capable of being positioned in juxtaposed relation with each other to said relation and means for varying the dimension of one of the relatable portions to match the dimensional characteristics of the other of said relatable portions.

7. A device of the character described for use with a viewing screen, said device comprising means for producing and for successively projecting test patterns for the respective eyes of an individual alternately on said viewing screen at periodic intervals, means for alternately rendering the test patterns separately visible to said respective eyes at such speed as to provide continuity of vision, said test patterns means embodying portions adjustable to appear in juxtaposed relation with each other on said viewing screen and embodying portions relatable as to dimensional characteristics, with the dimension of one of said relatable portions being variable relative to the dimension of the other relatable portions while retaining said juxtaposed portions in said relation and means for determining the extent of said variation.

8. A device of the character described for use with a viewing screen, said device comprising means for producing and for successively projecting test patterns for the respective eyes of an individual alternately on said viewing screen at periodic intervals, means for alternately rendering the test patterns separately visible to said respective eyes at such speed as to provide continuity of vision, said test pattern means embodying portions adjustable to appear in juxtaposed relation with each other on said viewing screen and embodying portions relatable as to dimensional characteristics, with the dimension of one of said relatable portions being variable relative to the dimension of the other relatable portion while retaining said juxtaposed portions in said relation and means for shifting the meridional relation of said relatable portions relative to each other.

JOHN R. KERRY.